Sept. 19, 1961    F. FAULHABER    3,000,280
PHOTOGRAPHIC CAMERA WITH AUTOMATIC ADJUSTMENT
OF EXPOSURE CONDITIONS
Filed Nov. 6, 1956
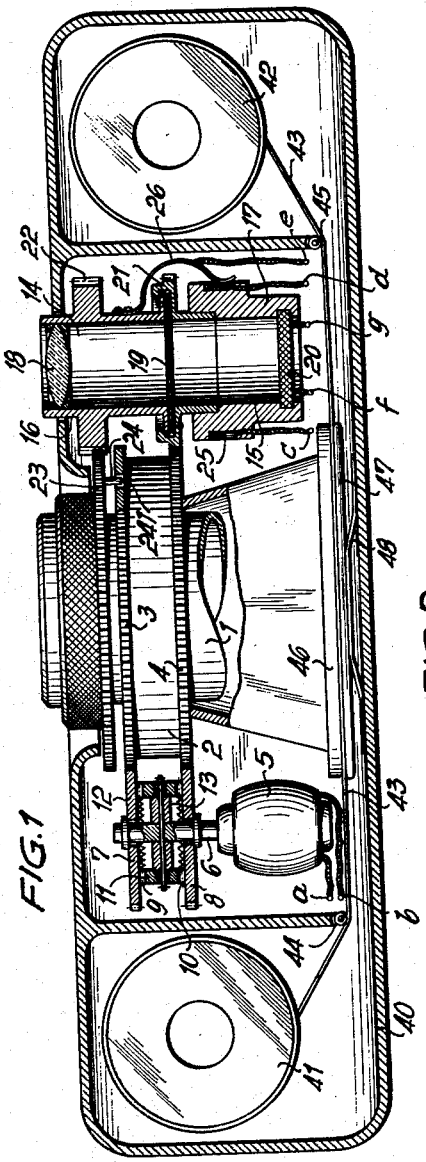
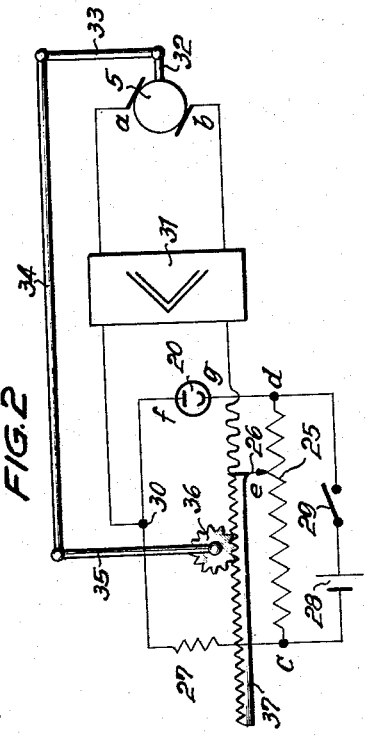
INVENTOR
FRITZ FAULHABER
BY
Mock+Blum
ATTORNEYS

United States Patent Office 3,000,280
Patented Sept. 19, 1961

3,000,280
PHOTOGRAPHIC CAMERA WITH AUTOMATIC ADJUSTMENT OF EXPOSURE CONDITIONS
Fritz Faulhaber, Schonaich, Bezirk Boblingen, Germany, assignor to Voigtlander Aktiengesellschaft, Braunschweig, Germany, a corporation of Germany
Filed Nov. 6, 1956, Ser. No. 620,627
Claims priority, application Germany Nov. 9, 1955
6 Claims. (Cl. 95—10)

This invention relates to photographic cameras provided with means for controlling the adjustment of exposure conditions in accordance with a photoelectric current derived from a photo-cell of the exposure meter. It has particular relation to photographic cameras, in which one or more exposure conditions—such as exposure time, diaphragm, film sensitivity, filter factor and the like—are preliminarily adjusted, whereupon an exposure factor which has not been taken into consideration in the preliminary adjustment—for example, the time value or diaphragm value—is combined with the light value ascertained by the exposure meter in the respective case.

Devices of this type, which have been known from the art, are of the most varied structure. The technical defects—for example, the defect occurring in the scanning procedure of the measuring pointer deflection of a highly sensitive galvanometer and its transmission to the automatically adjustable exposure elements (i.e., defects which apparently play an essential role in the lack of practical use of such devices up to date) will not be discussed here in detail. The defect which is of particular interest in connection with the present invention is a disadvantage which occurs in all known automatic camera systems and has its roots in general photographic requirements.

The conventional method of measuring exposure or light conditions by means of photographic exposure meters has the disadvantage that the light cone included by the exposure meter is too large and rather frequently does not correspond to the integral of the light density of the object to be photographed. The reason for this disadvantage originates in the easily understandable requirement for obtaining strong adjusting currents for the indicating instrument. By using a larger measuring angle, a higher measuring sensitivity is simulated. This is the reason why it is necessary in the use of conventional exposure meters to apply correction factors, which are derived from experimental data and have the character of probability values, in order to obtain satisfactory light measurements which are supposed to correspond to the relation between illumination of the object and illumination of its environment and call for practical experiences which are often not available to amateurs.

In order to eliminate these disadvantages, it has already been suggested—also in the case of automatic cameras—to carry out the light measurement with a small solid angle, i.e., a solid angle which amounts only to about ⅒ to ⅟₁₅ of the solid angle of the picture-taking objective and therefore includes merely a part of the object field, which is smaller than a medium sized photographic object. In devices embodying this suggestion, it is accepted that the small measuring angle—which is favorable from the photographic point of view—results in a correspondingly weaker photoelectric current and requires steps for the electric amplification of the measuring current, particularly at lower densities of illumination.

The main object of the present invention is to provide for carrying out light measuring with the most favorable light beam under any light-conditions which may occur in the taking of photographic pictures.

The means for attaining this object are based on the following considerations:

(a) If measuring of light conditions is carried out with a solid angle of the measuring light, incident in the photoelectric cell, which is larger than the image angle of the camera objective, a relatively strong photoelectric current will result, by which high sensitivity of the measuring device is simulated. However, the measurement proper will be incorrect under these conditions, in most cases, and will result in unsatisfactory pictures, because the exposure meter also integrates in its indication light which originates from objects located beyond the object space included by the picture-taking objective.

(b) If the light incidence angle for the exposure meter and for the picture-taking objective are equal, taking of pictures based on the indicated light measuring value will result in defective exposures, in all cases in which extensive portions of the image show other illumination conditions than those of the main motif, for example a person standing against a bright sunlighted sky in one case and against a distinctly dark background in the other case. The harmful effects of such defects are increased at increasing degree of contrasts, i.e. in general, in the case of bright illuminations.

(c) If the light conditions are measured with a solid angle which is rather small in comparison with the angle of the objective, then in the case of bright and medium illuminating conditions a satisfactory exposure of the important portions of the image can be expected. If the photographic light conditions are poor, for example, in the case of theatre performances, the photoelectric current produced with small light beams is frequently insufficient for satisfactory indications so that applicability of this measuring method is also relatively limited.

According to the present invention, the inherent defects of the known measuring methods are eliminated in simple manner by providing for variability of the solid angle of the light beam incident in the photoelectric cell. In this manner the photographer is in the position of having at his disposal for his pictures a light measuring method which is satisfactory in view of the motif of the image as well as in view of the prevailing light conditions in each case. If the light density in the object space is high, then—as a rule—considerable differences of illumination—for example, between bright portions and shadow portions—will be present. In other words, the image to be photographed is rich in contrasts. In view of the fact that, as has been already stated above, in the case of such image motifs, the integrating measurement of light over the entire solid angle of the image often results in defective exposures, according to the present invention in all cases of this type the measurement of light is carried out with a light incidence angle which is as small as possible and amounts only to about ⅟₂₀ of the angle of the picture-taking objective. Thereby, the small light incidence angle of the measuring light is of course correspondingly selected in such a manner that the light coming from the most important portion of the image is measured. In this manner this most important will always have a correct exposure. If the photographer additionally wants to find out whether his negative material is capable of taking up the range of contrasts present in the object space, then he will merely have to measure, with a small light incidence angle and in sequence, a brightest spot and a darkest spot of the image and to compare the two light values with each other. If, however, the intensity of illumination in the picture-taking space is lower, then measuring can be carried out, without objection, with larger solid light incidence angles in order to obtain a satisfactory meauring current. This is possible, because the larger solid angle does no harm in the case of lower light intensity values, because the contrasts are considerably softened and the differences in the illumination intensities will be more or less compensated so that the indicated light values apply to more extended surface portions. This means, in other words and briefly expressed, the following:

According to the invention, measurement of the light conditions is carried out in the case of bright illumination of the object with a small solid light angle and in the case of weak illumination of the object with a large solid light angle.

The device embodying the present invention can be applied to cameras of all conventional types and can be operated in simple manner directly by hand or over coupled transmission members. The use of the invention is particularly advantageous in cameras in which the last exposure factor which leads to the correctly combined light value—for example, the time or diaphragm—is automatically adjusted by an automatic system which is known by itself and is controlled by the current of the photoelectric cell.

According to a further development of the invention, it is also contemplated that simultaneously with the automatic adjustment of the last exposure factor, the solid angle of the light beam incident on the photo-cell is likewise automatically adjusted. In other words, this angle is automatically modified in accordance with the illumination intensities of the objects included by the solid angle of the exposure meter in each case.

In carrying out the present invention, so-called photo-elements, as well as so-called photo-cells, can be used. If a photo-element is used which produces electric current by itself upon the incidence of light, then an electrical amplifier—for example, a transistor amplifier arrangement—must be provided so that even in the case of very small measuring angles or under particularly poor light conditions, a satisfactorily defined indication and automatic adjustment take place. The use of an electric amplifier for the photo-electric current can be dispensed with if, in carrying out the present invention, the light sensitive organ of the exposure meter consists of a photo-resistance cell.

The electrical circuit containing the photo-resistance cell can be temperature-compensated by means known by themselves. It can be also voltage-compensated in such a manner that the operating voltage of the battery which operates the resistance photo-cell, can be varied within unusually wide limits without affecting the results of measuring.

It has been found in experimental tests that by means of such a measuring arrangement illuminating intensities down to about 1 lux can be measured. Thus, the invention renders available to the photographer even those measuring ranges in which the exposure meters available at present do not give any indication at all. The necessity of correct measuring of light values even in the case of low light intensities will steadily increase in the future, mainly in view of the always increasing sensitivity of the negative materials.

It is also contemplated according to the present invention to provide, in cameras having exchangeable objectives, means which have the effect of changing the solid angle for the exposure meter upon the insertion of an objective in conformity with the image angle of the respective objective. It is thereby preferred to change merely the upper limit, while the lower limit remains equal for all objectives used.

It is contemplated according to the present invention that the highest measuring angle in the case of each exchangeable objective applied to the camera is kept somewhat smaller—i.e., by way of example, about 10% of the included surface—than the image angle of the objective. By proceeding in this manner, in no case will the measuring light incident on the photo-cell originate from other than from the object to be photographed. Moreover, light measurement carried out in this manner has the tendency of including—even in the case of the largest measuring angle—only important portions of the image, which is essential in obtaining correct measurement of the light. Modification of the angle limit can be carried out mechanically, for example by means of one or more eccentric discs and contact pins sliding thereon, as well as electrically, for example by automatic switching of the standard resistance in a bridge circuit upon application of the objective.

The appended drawings illustrate by way of example and without limitation, a photographic camera with automatic adjustment of the exposure factors, for example exposure time or objective diaphragm, said adjusting means being controlled by an electric exposure meter.

In the drawings,

FIG. 1 illustrates in top view, partially in section, a photographic camera provided with automatic adjusting means and a device for adjusting the measuring angle of the light beam; and FIG. 2 diagrammatically illustrates an electric circuit adapted to be used in combination with the device shown in FIG. 1.

Referring now to the drawings in detail, in FIG. 1 the objective mount 1 is enclosed by the camera shutter 2 having a time adjusting ring 3, formed with external gear teeth, and a diaphragm adjusting ring 4 also formed with external gear teeth. The automatic adjustment of exposure conditions—which is controlled by an exposure meter—is brought about by motor 5 through a differential gear seated on shaft 6, said gear being in engagement with the teeth of the time adjusting ring 3 and diaphragm adjusting ring 4. The differential gear consists of the gears 7 and 8 which are loosely held on the shaft 6 and are rotatable thereon. These two gears 7 and 8 are provided on their facing inner surfaces with gear teeth 9 and 10, which mesh with pinions 11 and 12. Pinions 11 and 12 are rotatable about a common shaft 13. The shaft 13 is perpendicular to shaft 6 and is fixedly connected therewith. Thus, pinions 11 and 12 can be turned also about the motor shaft 6. Gear 7 meshes with time adjusting ring 3 and gear 8 meshes with diaphragm adjusting ring 4.

Reference symbol 40 denotes the camera casing. 41 and 42 denote the film spools, between which the film is guided over the guide rollers 44 and 45 in front of the picture window 46. 47 denotes the film pressure plate with a spring shown at 48.

In using a camera embodying the present invention, the following steps are taken.

First, one of the two exposure factors—i.e. time or diaphragm—is manually adjusted to a desired initial value and arrested at this value, whereupon coordination of the other exposure factor—i.e. diaphragm or time—for correct exposure, is automatically effected by motor 5. Depending on whether the time adjusting ring 3 or the diaphragm adjusting ring 4 is arrested, upon rotation of motor shaft 6 pinions 11 and 12 will roll either on gear teeth 9 or on gear teeth 10 and will drive the respective gear 8 or 7 and thus adjust the corresponding exposure factor, i.e. diaphragm or time.

On the right side of the objective mount within the camera shutter, a condensing device for the measuring light is shown in connection with the photoelectric control element of the automatic system and a potentiometer 25. The light shaft of the condensing device consists of two chambers 14 and 15, which are laterally limited by a tube 16 and a pot-shaped insulating body 17. On its front end and rear end, the chamber 14 is terminated by objective 18 and the iris diaphragm 19, and the chamber 15 has its ends terminated by the iris diaphragm 19 and the photo cell 20. In carrying out the invention, the use of a photoresistance cell is preferred. The lengths of the chambers 14 and 15 are approximately equal and correspond to the focal length of objective 18. The objective 18 and the light-sensitive layer of the photoresistance cell 20 have approximately equal cross-sections. Formation of the image by objective 18 takes place in the plane of the diaphragm 19. By changing the opening in the iris diaphragm, for passage of light, smaller or larger marginal zones can be cut off from the image, so that only the light originating from the remaining central zone is incident in the cell 20 and is measured. This means that the light conditions in the object space can be measured at any desired solid angle which is in the range between the solid angle included by the objective 18 and a minimum value which is determined by the diaphragm construction. As the distance between diaphragm 19 and photo cell 20 likewise corresponds to the focal length of the objective, the light incident through any selected diaphragm aperture will be distributed over the entire photo cell surface, at any measuring angle.

The casing of the diaphragm 19 consists of two parts which are movable relative to each other, each of the diaphragm lamellae being fastened with one end thereto. In the embodiment shown in the drawing, one part of the diaphragm is shown as the tube 16 and the other as a ring gear member 21, to which the insulating body 17 is fixedly connected. The teeth of ring 21 mesh with the teeth of the diaphragm adjusting ring 4 for the picture-taking objective. The tube 16 is provided with a wide ring gear 22, which is in connection with time adjusting ring 3 through an intermediate ring gear 23 having a coupling pin 24. The intermediate ring gear 23 is provided for taking into consideration an additional exposure factor, for example the film sensitivity. In order to attain this, said intermediate ring can be removed in the direction of the axis of the objective from the time adjusting ring 3, for example against spring effect, until its pin 24 is free from the stop hole 241 of time adjusting ring 3 so that now the film sensitivity can be adjusted by turning ring 23 relative to time ring 3, whereupon pin 24 drops again in the corresponding recess 241 in time adjusting ring 3. A separate drop-in hole 241 is provided for each film sensitivity value. As the adjusting ring 23 always remains in engagement with toothed rim 22, adjustment of film sensitivity is simultaneously transmitted to diaphragm 19 of the device for adjusting the measuring angle of the light beam, whereby the position of potentiometer slider 26 (which is fastened to tube 16) is changed correspondingly on the potentiometer winding 25.

In the range of engagement with the differential gear and the device for adjusting the measuring angle of the light beam, or like condensing device, the teeth of the diaphragm adjusting ring 4, the time adjusting ring 3 and the intermediate ring 23, are located within the camera casing 40, while the rest of the periphery—for example the downward and upward turned section—is freely accessible. Along these portions, the rings can be manually operated for the selected preliminary adjustment of the shutter time or the diaphragm.

The electrical connections a—g provided according to FIG. 1 are denoted in the corresponding wiring diagram of FIG. 2 with the same reference symbols a—g. The measuring bridge contains the photo-resistance cell 20, the standard resistance 27, the potentiometer 25 with the slider 26, the battery 28 and the switch 29. The two electric connections, i.e. that from point 30 which is located between photo-cell 20 and standard resistance 27 and that from slider 26, lead to an electrical current of the 31, from which the amplified differential current of the bridge is conducted to motor 5. The adjusting motor 5 can be a reversible motor. By the motor—over transmission gearing 32, 33, 34, 35—a pinion 36 is turned, which causes movement of the potentiometer slider 26 by means of a rack 37. Gearing 32, 33, 34, 35, pinion 36, and rack 37 are the functional equivalent of the gearing 3, 4, 7–17, 21, 22, and 23 of FIG. 1 and are, in effect, a schematic showing of the gearing of FIG. 1.

Operation of the automatic device according to the embodiment illustrated in the drawings, takes place as follows.

It is assumed that the stop connection 24, 241 between ring gear 23 and time adjusting ring 3, is adjusted in conformity with the sensitivity of the negative material used, so that the influence of this exposure factor on the position of the iris diaphragm 19 is taken into consideration. Prior to taking a picture, the time ring or the diaphragm ring of the camera shutter is turned to the desired value and arrested in this position. This preliminary adjustment causes in each case—in view of the above described connections between the objective shutter and the device for adjusting the measuring angle of the light beam of the exposure meter part—likewise a corresponding adjustment of the iris diaphragm 19 and of the bridge potentiometer 25 and its slider 26, so that this exposure factor is likewise included by the photo-electrically controlled automatic system. If now the camera is directed to an object to be photographed and the electric switch 29 is closed, the final adjustment of exposure conditions will take place automatically and correctly relative to the light value in the respective case. As the electrical measuring bridge is first not balanced, a differential current will flow from the bridge to the amplifier 31. The amplified differential current causes rotation of the motor 5 in one or the other direction. Thereby the slide 26 is displaced until the differential current of the bridge is reduced to zero and the motor 5 stops. Simultaneously, adjustment of the exposure conditions has taken place. If the object space is brightly illuminated, i.e. if light of high intensity is incident through the condensing device for the photo-cell 20, the bridge balance will not be reached before the iris diaphragm 19 and with it the picture taking diaphragm too is drawn to a relatively small opening for the passage of light. If, on the other hand, illumination of the object is less bright, then the iris diaphragm 19 has to be drawn to a small extent only in order to attain the bridge balance.

It is believed to be clear from the above that the automatic system used according to the present invention always operates with the most favorable light measuring angle. It is small in the case of a rather bright illumination and it is larger in the case of a less bright illumination. In the case of bright illumination and strong contrasts, the small solid angle of the measuring light has the effect of including only an important image section of the object space, whereby correct exposure of the picture to be taken results. In the case of a weaker illumination, measuring is automatically carried out with a larger solid light angle, whereby, however, in view of smaller contrasts, defective exposures are likewise avoided. The advantages of the device according to the present invention are particularly noticeable in taking pictures in relatively weakly illuminated environments, because—as already mentioned above—illuminations down to a few lux units can be correctly measured according to the invention.

The system or arrangement according to the present invention is particularly suitable for amateur cameras, but it can be used with equal advantages in all types of cameras.

It will be understood from the above that the present invention is not limited to the elements, arrangements, combinations and other details specifically described above and illustrated in the drawings and can be carried out with various modifications without departing from the scope of the invention as defined ni the appended claims.

What is claimed is:

1. A photographic camera comprising, in combination, an objective mount, a shutter embracing said objecitve mount; a first manually adjustable geared adjusting ring rotatably mounted on said shutter for adjusting a first exposure condition; a second manually adjustable geared adjusting ring rotatably mounted on said shutter for adjusting a second exposure condition; an electric motor; differential gearing interconnecting said motor and each of said rings, an exposure meter including a photo-electric element and a light condensing system directing light upon said element, said exposure meter including an iris diaphragm in front of said element and including blades connected to a pair of coaxial relatively rotatable members for adjustment of the iris diaphragm opening by relative rotation of said members; first driving mechanism interconnecting one of said members and said first ring for conjoint rotation; second driving mechanism interconnecting the other of said members and said second ring for conjoint rotation, said second driving mechanism including an intermediate component in constant driving connection with said other member and normally in driving connection with said second ring; said component being displaceable out of driving connection with said second ring for manual adjustment of itself, conjointly with adjustment of said other member to adjust said iris diaphragm opening, to adjust a third exposure condition; a source of electric potential, a resistance fixed to one of said members; a contact fixed to the other of said members and movable along said resistance upon relative rotation of said members; and a normally open null balance circuit including said photo-electric element, said resistance and its associated contact, and said source in three parallel branches, the output of said circuit being applied to said motor; whereby, upon manual adjustment of one of said rings to adjust one of said first and second exposure conditions followed by closing of said circuit, said motor will be energized, responsive to any unbalance in said circuit, to adjust the other ring through said differential gearing to adjust the other one of said first and second exposure conditions conjointly with adjustment of said iris diaphragm to adjust the solid angle of the light incident upon said photo-electric element.

2. A photographic camera as claimed in claim 1 in which said relatively rotatable members comprise a pair of coaxial relatively rotatable tubes constituting the casing of the exposure meter.

3. A photographic camera as claimed in claim 2 in which said photo-electric element is at the outer end of one of said tubes and a condensing lens is at the outer end of the other of said tubes, the iris diaphragm being located substantially one-half the distance between said photo-electric element and said lens.

4. A photographic camera as claimed in claim 2 in which said driving mechanisms comprise ring gears formed on said tubes; and said intermediate component comprises an idler gear meshing with one of said ring gears and carrying a pin engageable in a selected one of a series of holes in one of said geared exposure condition adjusting rings.

5. A photographic camera as claimed in claim 1 in which said intermediate component is effective to adjust said iris diaphragm opening in accordance with the film sensitivity.

6. A photographic camera as claimed in claim 2 in which one of said tubes is of dielectric material and has said resistance extending circumferentially therearound.

References Cited in the file of this patent

UNITED STATES PATENTS

| | | |
|---|---|---|
| 1,990,361 | Bailey | Feb. 5, 1935 |
| 2,059,032 | Riszdorfer | Oct. 27, 1936 |
| 2,091,762 | Kuppenbender | Aug. 31, 1937 |
| 2,209,156 | Fischer | July 23, 1940 |
| 2,700,916 | Muirhead | Feb. 1, 1955 |
| 2,780,971 | Fahlenberg | Feb. 12, 1957 |